Patented Aug. 29, 1933

1,924,528

UNITED STATES PATENT OFFICE 1,924,528

METHOD OF WELDING METALS

Romaine G. Waltenberg, Roselle, N. J., assignor to The H. A. Wilson Company, Newark, N. J., a corporation of New Jersey No Drawing. Application March 13, 1931
Serial No. 522,525

17 Claims. (Cl. 78—92)

This invention relates to welding and is concerned more particularly with a novel method of welding together a pair of metal plates with their faces in contact. The method of my invention is of particular utility in connection with the manufacture of bimetallic strips for thermostatic purposes and an adaptation of the method for that purpose will be described in detail by way of illustration, though it is to be understood that the utility of the invention is not dependent upon the purpose for which the bimetallic element is to be used.

Bimetallic plates or strips composed of metals which have different coefficients of expansion are now used in large quantities in thermostatic control devices. Metals commonly used for these plates are nickel steel alloys of the desired expansion characteristics, the alloys sometimes including appreciable amounts of chromium. In the manufacture of such a bimetallic element, the two plates which are to form its constituents are preferably secured together face to face by welding and difficulties have been encountered in producing a satisfactory union of the two plates in this manner, particularly when the alloys employed are of the chromium-nickel-steel type.

The present invention is accordingly directed to the provision of a method for welding together a pair of plates of metals or alloys, such as nickel steel alloys, having similar melting points without the use of a relatively lower melting point metal interposed between the plates and without fusing either of the plates which are to be united. By this method, the two members of the element are secured together face to face with a practically perfect weld and the treatment to which the members are subjected during the welding does not alter their expansion characteristics to any detrimental degree or prevent their being rolled or otherwise worked in converting them into the final product. The method is, therefore, particularly applicable in welding together a pair of plates of different expansion characteristics to produce a bi-metallic element which flexes or bows when subjected to temperature variations.

The new method takes advantage of the effect of additions of carbon on certain metals to lower the fusion points thereof and according to the new method, the surfaces of the plates which are to be brought into contact and welded together are carburized so that they will weld at temperatures below the fusion temperatures of either of the metals. The carburizing treatment is carried on under such conditions that harmful effects which might result from excessive carbon additions are prevented and the method, therefore, permits welding together of two metals having melt points which are similar and of a relatively high order without the use of lower melt point metals and without subjecting the metals to be welded to temperatures as high as their fusion points.

While the new method may be practiced in connection with the welding of a single pair of plates, it is advantageous to weld a large number of pairs of plates at the same time and such a procedure will accordingly be described, though it is to be understood that the method is equally applicable to the treatment of any number of pairs of plates that may be desired.

As a preliminary operation to the welding, the surfaces of the plates are thoroughly cleaned and this is accomplished by pickling the plates, washing to remove the pickling solution, and then brushing the plates thoroughly. Thereafter any irregularities such as burrs or protuberances are removed from the surfaces by filing, so that when the plates are ready for welding, the surfaces to be joined are clean and smooth. As an advantageous way of providing carbonaceous material, that surface of each plate which is to lie in contact with the other is coated with a mixture of heavy oil and graphite and after coating, the plates are paired and placed with the painted face of one plate in contact with the painted face of the other. The matched pairs of plates are then piled or stacked and to maintain the pairs separate, the upper surface of each pair is given a coating of lime.

When a pile of matched or paired plates has been built up in the manner described to the desired number, the pile is picked up in any convenient manner, as by an elevator truck, and placed in a furnace which preferably has a vertical heating chamber. The plates are to be maintained with their faces in close contact during the treatment in the furnace and for this purpose the pile may be raised into the furnace so as to lift a dead weight therein. This weight applies pressure on the pile throughout the treatment and keeps the surfaces which are to be welded in intimate contact. The dead weight may be of any convenient type. The furnace is maintained substantially airtight during a part of the heat treatment and accordingly the top of the furnace may be sealed by an oil seal which permits vertical movement of the dead weight as the pile of plates lifts it. The bottom of the furnace chamber is sealed, for example, by a sand seal at the base of the elevator.

After the pile of plates has been placed in the furnace, the temperature is raised, eventually reaching a point just below the fusion temperature of the metals present. During the heating, the oil between the plates is vaporized and this produces a carburizing atmosphere in the furnace chamber. This atmosphere together with the graphite between the plates results in an increase in carbon content with consequent reduction of the fusion temperature in the metal at the surfaces which are to be welded together and as the heating continues, these layers of low melting point material fuse and form a bond between the plates of each pair.

The bonding together of the plates in the pile may require a considerable period of time and during this period, the edges of the plates are exposed to the carburizing atmosphere and may take up sufficient carbon so that the edges would crack or open during subsequent rolling, unless steps were taken to prevent this result. Accordingly, after the plates have been thoroughly bonded, a decarburizing action is effected by opening a hole in the top of the furnace chamber to allow the gases in the furnace to burn. During this second period, the plates are maintained in the furnace at the bonding temperature and the metals of the plates of each pair diffuse into each other so that the bond is improved. After the decarburization has continued for the desired period, the pile of plates is lowered out of the furnace and the plates are ready for rolling.

While I have found it convenient and advantageous to place oil or carbonaceous material between the faces of the plates which are to be joined, the maintenance of a carburizing atmosphere in the furnace may be accomplished by introducing suitable carbonaceous material into the furnace chamber before or during the heating of the plates. I have found that it is possible to obtain good bonds or welds without changing the character of the atmosphere in the furnace chamber but superior welds are obtained when a strongly carburizing atmosphere is maintained in the furnace during the first part of the heating, followed by a non-reducing atmosphere, either neutral or slightly oxidizing. This treatment also eliminates the likelihood of the edges opening or cracking when the plates are rolled. The maintenance of the carburizing atmosphere avoids the necessity of using a flux and produces an excellent bond between the plates at a temperature somewhat below the fusion temperature of the metals present.

What I claim:

1. A method of welding together plates of ferrous metals having melting points of substantially the same order which comprises applying carbonaceous material to one face of each plate, placing the plates with their coated faces in contact, heating the plates to a temperature below the melting points of said metals, and during the first part of the heating, preventing oxidation of the carbonaceous material.

2. A method of welding together plates of metals having melting points of substantially the same order which comprises applying carbonaceous material to one face of each plate, placing the plates with their coated faces in contact into a closed furnace chamber, heating the plates to a temperature below the melting points of said metals, and after a period of heating, opening the furnace while the heating continues.

3. A method of welding together plates of ferrous metals having substantially the same melting points which comprises placing the plates in face contact in a closed furnace chamber, introducing carbonaceous material into the chamber, heating the plates to a temperature below the melting points of said metals and until the contacting surfaces have been carburized to an extent sufficient to reduce their melting points to approximately the temperature within the furnace chamber.

4. A method of welding together plates of metals of which the melting points are lowered by the addition of carbon, said metals having melting points of substantially the same order which comprises applying pressure to the plates to maintain them in face contact, heating the plates to a temperature below the fusion temperature of the metals present, and maintaining a carburizing atmosphere about said plates for a period sufficient to effect carburization of the contacting surfaces thereof.

5. A method of welding together plates of metals having melting points of substantially the same order, which melting points are lowered by the addition of carbon which comprises applying carbonaceous material to one face of each plate, placing the plates with their coated faces in contact, placing pairs of the plates thus arranged in a pile with material between the adjacent plates of consecutive pairs capable of preventing their sticking together, heating the plates to a temperature below the melting points of said metals, and, during the heating, maintaining a carburizing atmosphere about said plates for a period sufficient to effect carburization of the contacting surfaces of said plates.

6. A method of welding together plates of metals, the melting points of which are lowered by the addition of carbon which comprises applying carbonaceous material to one face of each plate, placing the plates with their coated faces in contact, placing pairs of the plates thus arranged in a pile with material between the adjacent plates of consecutive pairs capable of preventing their sticking together, pressing the plates together, heating the plates to a temperature below the melting points of said metals, and, during the heating, maintaining a carburizing atmosphere about said plates for a period sufficient to effect carburization of the contacting surfaces of said plates, and thereafter maintaining a non-reducing atmosphere about said plates to effect de-carburization of the edges of the plates.

7. A method of welding together plates of metals, the melting points of which are similar and are lowered by the addition of carbon which comprises applying carbonaceous material to one face of each plate, placing the plates with their coated faces in contact, placing pairs of the plates thus arranged in a pile with material between the adjacent plates of consecutive pairs capable of preventing their sticking together, introducing the plates into a closed furnace, heating the plates to a temperature below the melting points of said metals for a period sufficient to effect carburization of the contacting surfaces of the plates, and thereafter opening the furnace while the heating continues to effect de-carburization of the edges of the plates.

8. A method of welding together plates of metals, the melting points of which are similar and are lowered by the addition of carbon to said metals which comprises applying carbonaceous material to one face of each plate, placing the plates with their coated faces in contact, placing pairs of the plates thus arranged in a pile with material between the adjacent plates of consecutive pairs capable of preventing their sticking together, introducing the plates into a furnace, applying pressure to the plates to force them together, heating the plates to a temperature below the melting points of said metals, and, during a part of the heating, maintaining a carburizing atmosphere about said plates for a sufficient period to effect carburization of the contacting surfaces of said plates and thereafter maintaining a non-reducing atmosphere about said plates, for a period sufficient to de-carburize the edges of said plates.

9. A method of welding together plates of ferrous metals which comprises cleaning the surfaces of the plates to be welded together, holding the plates with their said surfaces in contact, heating the plates to a temperature below the melting points of said metals, and during the heating, maintaining a carburizing atmosphere about said plates for a period sufficient to effect carburization of the contacting surfaces of said plates.

10. A method of welding together plates of metals having melting points which are similar and which are lowered by the addition of carbon to said metals which comprises holding the plates in face contact, heating the plates to a temperature below the melting points of said metals, and, during the heating, increasing the carbon content in the contacting surfaces of the plates.

11. A method of welding together plates of metals having similar melting points, which melting points are lowered by the addition of carbon to said metals which comprises holding the plates in face contact, heating the plates to a temperature below the melting points of said metals, and, during the heating, increasing the carbon content in the contacting surfaces of the plates, and thereafter discontinuing the addition of carbon to said surfaces and continuing the heating to cause diffusion into the metal of the carbon added.

12. A method of welding together a pair of plates of ferrous metals having melting points of substantially the same order, which comprises holding the plates with their faces in contact, heating the plates to a temperature below the melting points of said metals, and, during the heating, introducing carbon into the metals at the contacting surfaces to reduce the melting points of said surfaces.

13. A method of welding together a pair of plates of ferrous metals having melting points of substantially the same order, which comprises holding the plates with their faces in contact, heating the plates to a temperature below the melting points of said metals, and, during the heating, carburizing the surfaces of the plates to reduce the melting points of said surfaces by maintaining a carburizing atmosphere in contact with said surfaces.

14. A method of welding together a pair of plates of metals having melting points of substantially the same order, which comprises holding the plates with their faces in contact, heating the plates to a temperature below the melting points of said metals, carburizing the surfaces of the plates during the heating to reduce the melting points of said surfaces by maintaining said plates in a carburizing atmosphere, and thereafter and while the heating continues, de-carburizing the edges of said plates.

15. A method of welding together a pair of plates of metals having melting points of substantially the same order, which comprises holding the plates with their faces in contact, heating the plates to a temperature below the melting points of said metals, carburizing the surfaces of the plates during the heating to reduce the melting points of said surfaces by maintaining said plates in a carburizing atmosphere, and thereafter and while the heating continues, establishing a non-reducing atmosphere about said plates to effect de-carburization of the edges thereof.

16. A method of welding together a pair of plates of ferrous metals having melting points of substantially the same order, which comprises placing the plates in face contact within a closed furnace chamber, heating the plates to a temperature below the melting points of said metals, and, during the heating, reducing the melting points of the metals in the contacting surfaces of the plates by adding carbon to the metals in said surfaces.

17. A method of welding together a pair of plates of metals having melting points of substantially the same order, which comprises placing the plates in face contact within a closed furnace chamber, heating the plates to a temperature below the melting points of said metals, carburizing the contacting surfaces of the metals during the heating to reduce the melting points of said surfaces, and thereafter de-carburizing the edges of said plates, while the heating continues.

ROMAINE G. WALTENBERG.